US010083396B2

(12) United States Patent
Knight

(10) Patent No.: US 10,083,396 B2
(45) Date of Patent: Sep. 25, 2018

(54) COMPUTER-IMPLEMENTED SYSTEM AND METHOD FOR ASSIGNING CONCEPT CLASSIFICATION SUGGESTIONS

(71) Applicant: FTI CONSULTING, INC., Annapolis, MD (US)

(72) Inventor: William C. Knight, Bainbridge Island, WA (US)

(73) Assignee: FTI Consulting, Inc., Annapolis, MD (US)

( * ) Notice: Subject to any disclaimer, the term of this patent is extended or adjusted under 35 U.S.C. 154(b) by 0 days.

(21) Appl. No.: 14/746,725

(22) Filed: Jun. 22, 2015

(65) Prior Publication Data
US 2015/0286957 A1 Oct. 8, 2015

Related U.S. Application Data

(63) Continuation of application No. 13/970,545, filed on Aug. 19, 2013, now Pat. No. 9,064,008, which is a
(Continued)

(51) Int. Cl.
*G06F 17/30* (2006.01)
*G06N 5/02* (2006.01)
(Continued)

(52) U.S. Cl.
CPC ............ *G06N 5/02* (2013.01); *G06F 17/3064* (2013.01); *G06F 17/3071* (2013.01);
(Continued)

(58) Field of Classification Search
CPC ......... G06F 17/30705; G06F 17/30707; G06F 17/30713; G06F 17/30601; G06F 17/3071; G06F 17/30873
See application file for complete search history.

(56) References Cited

U.S. PATENT DOCUMENTS 3,416,150 A 12/1968 Lindberg
3,426,210 A 2/1969 Agin
(Continued)

FOREIGN PATENT DOCUMENTS

EP 0886227 12/1998
EP 1024437 8/2000
(Continued)

OTHER PUBLICATIONS

Liu et al. "Robust Multi-class transdructive learning with graphs", Jun. 2009.*
(Continued)

*Primary Examiner* — Carol Choi
(74) *Attorney, Agent, or Firm* — Patrick J. S. Inouye; Krista A. Wittman

(57) ABSTRACT

A computer-implemented system and method for assigning concept classification suggestions is provided. One or more clusters of concepts is accessed. The concepts include uncoded concepts and one or more reference concepts selected from a set of reference concepts. Each reference concept is associated with a classification code. One of the uncoded concepts is selected for classification in one such cluster. At least one of the reference concepts located closest to the selected uncoded concept is identified. The classification code of the closest located reference concept is assigned to the selected uncoded concept as a suggested classification code.

16 Claims, 8 Drawing Sheets

Related U.S. Application Data continuation of application No. 12/844,785, filed on Jul. 27, 2010, now Pat. No. 8,515,958.

(60) Provisional application No. 61/229,216, filed on Jul. 28, 2009, provisional application No. 61/236,490, filed on Aug. 24, 2009.

(51) Int. Cl.
  *G06N 7/00* (2006.01)
  *G06N 99/00* (2010.01)
  *G06N 5/04* (2006.01)

(52) U.S. Cl.
  CPC .. *G06F 17/30601* (2013.01); *G06F 17/30675* (2013.01); *G06F 17/30705* (2013.01); *G06F 17/30707* (2013.01); *G06F 17/30713* (2013.01); *G06F 17/30873* (2013.01); *G06N 5/047* (2013.01); *G06N 7/005* (2013.01); *G06N 99/005* (2013.01)

(56) References Cited

U.S. PATENT DOCUMENTS

| | | |
|---|---|---|
| 3,668,658 A | 6/1972 | Flores et al. |
| 4,893,253 A | 1/1990 | Lodder |
| 4,991,087 A | 2/1991 | Burkowski et al. |
| 5,056,021 A | 10/1991 | Ausborn |
| 5,121,338 A | 6/1992 | Lodder |
| 5,133,067 A | 7/1992 | Hara et al. |
| 5,182,773 A | 1/1993 | Bahl et al. |
| 5,276,789 A | 1/1994 | Besaw et al. |
| 5,278,980 A | 1/1994 | Pedersen et al. |
| 5,359,724 A | 10/1994 | Earle |
| 5,371,673 A | 12/1994 | Fan |
| 5,371,807 A | 12/1994 | Register et al. |
| 5,442,778 A | 8/1995 | Pedersen et al. |
| 5,450,535 A | 9/1995 | North |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,706,497 A | 1/1998 | Takahashi et al. |
| 5,737,734 A | 4/1998 | Schultz |
| 5,754,938 A | 5/1998 | Herz et al. |
| 5,754,939 A | 5/1998 | Herz et al. |
| 5,787,422 A | 7/1998 | Tukey et al. |
| 5,794,178 A | 8/1998 | Caid et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,819,260 A | 10/1998 | Lu et al. |
| 5,835,905 A | 11/1998 | Pirolli et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,895,470 A | 4/1999 | Pirolli et al. |
| 5,909,677 A | 6/1999 | Broder et al. |
| 5,915,024 A | 6/1999 | Kitaori et al. |
| 5,915,249 A | 6/1999 | Spencer |
| 5,920,854 A | 7/1999 | Kirsch et al. |
| 5,924,105 A | 7/1999 | Punch et al. |
| 5,940,821 A | 8/1999 | Wical |
| 5,943,669 A | 8/1999 | Numata |
| 5,950,146 A | 9/1999 | Vapnik |
| 5,950,189 A | 9/1999 | Cohen et al. |
| 5,966,126 A | 10/1999 | Szabo |
| 5,974,412 A | 10/1999 | Hazlehurst et al. |
| 5,987,446 A | 11/1999 | Corey et al. |
| 5,987,457 A | 11/1999 | Ballard |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,092,091 A | 7/2000 | Sumita et al. |
| 6,094,649 A | 7/2000 | Bowen et al. |
| 6,100,901 A | 8/2000 | Mohda et al. |
| 6,108,446 A | 8/2000 | Hoshen |
| 6,119,124 A | 9/2000 | Broder et al. |
| 6,122,628 A | 9/2000 | Castelli et al. |
| 6,134,541 A | 10/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,213 A | 11/2000 | Rennison et al. |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,253,218 B1 | 6/2001 | Aoki et al. |
| 6,260,038 B1 | 7/2001 | Martin et al. |
| 6,300,947 B1 | 10/2001 | Kanebsky |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,363,374 B1 | 3/2002 | Corston-Oliver et al. |
| 6,377,287 B1 | 4/2002 | Hao et al. |
| 6,381,601 B1 | 4/2002 | Fujiwara et al. |
| 6,389,433 B1 | 5/2002 | Bolonsky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,635 B1 | 4/2003 | Hu et al. |
| 6,542,889 B1 | 4/2003 | Aggarwal et al. |
| 6,544,123 B1 | 4/2003 | Hiromichi et al. |
| 6,549,957 B1 | 4/2003 | Hanson et al. |
| 6,560,597 B1 | 5/2003 | Dhillon et al. |
| 6,564,202 B1 | 5/2003 | Schuetze et al. |
| 6,571,225 B1 | 5/2003 | Oles et al. |

(56) References Cited

U.S. PATENT DOCUMENTS

| | | |
|---|---|---|
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,640,009 B2 | 10/2003 | Zlotnick |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Copperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,778,995 B1 | 8/2004 | Gallivan |
| 6,785,679 B1 | 8/2004 | Dane et al. |
| 6,789,230 B1 | 9/2004 | Katariya et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,826,724 B1 | 11/2004 | Shimada et al. |
| 6,841,321 B2 | 1/2005 | Matsumoto et al. |
| 6,847,966 B1 | 1/2005 | Sommer et al. |
| 6,862,710 B1 | 3/2005 | Marchisio |
| 6,879,332 B2 | 4/2005 | Decombe |
| 6,880,132 B2 | 4/2005 | Uemura |
| 6,883,001 B2 | 4/2005 | Abe |
| 6,886,010 B2 | 4/2005 | Kostoff |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,968,511 B1 | 11/2005 | Robertson et al. |
| 6,970,881 B1 | 11/2005 | Mohan et al. |
| 6,970,931 B1 | 11/2005 | Bellamy et al. |
| 6,976,207 B1 * | 12/2005 | Rujan ............... G06F 17/3071 707/999.005 |
| 6,978,419 B1 | 12/2005 | Kantrowitz |
| 6,990,238 B1 | 1/2006 | Saffer et al. |
| 6,993,517 B2 | 1/2006 | Naito et al. |
| 6,996,575 B2 | 2/2006 | Cox et al. |
| 7,003,551 B2 | 2/2006 | Malik |
| 7,146,361 B2 | 2/2006 | Broder et al. |
| 7,013,435 B2 | 3/2006 | Gallo et al. |
| 7,020,645 B2 | 3/2006 | Bisbee et al. |
| 7,039,856 B2 | 5/2006 | Peairs et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,107,266 B1 | 9/2006 | Breyman et al. |
| 7,117,151 B2 | 10/2006 | Iwahashi et al. |
| 7,117,246 B2 | 10/2006 | Christenson et al. |
| 7,117,432 B1 | 10/2006 | Shanahan et al. |
| 7,130,807 B1 | 10/2006 | Mikurak |
| 7,131,060 B1 | 10/2006 | Azuma |
| 7,137,075 B2 | 11/2006 | Hoshito et al. |
| 7,139,739 B2 | 11/2006 | Agrafiotis et al. |
| 7,155,668 B2 | 12/2006 | Holland et al. |
| 7,158,957 B2 | 1/2007 | Joseph et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cossock |
| 7,209,949 B2 | 4/2007 | Mousseau et al. |
| 7,233,843 B2 | 6/2007 | Budhraja et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Dohono et al. |
| 7,292,244 B2 | 11/2007 | Vafiadis et al. |
| 7,325,127 B2 | 1/2008 | Olkin et al. |
| 7,353,204 B2 | 4/2008 | Liu |
| 7,359,894 B1 | 4/2008 | Liebman et al. |
| 7,363,243 B2 | 4/2008 | Arnett et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Copperman et al. |
| 7,412,462 B2 | 8/2008 | Margolus et al. |
| 7,418,397 B2 | 8/2008 | Kojima et al. |
| 7,430,688 B2 | 9/2008 | Matsuno et al. |
| 7,430,717 B1 | 9/2008 | Spangler |
| 7,433,893 B2 | 10/2008 | Lowry |
| 7,440,662 B2 | 10/2008 | Antona et al. |
| 7,444,356 B2 | 10/2008 | Calistri-Yeh et al. |
| 7,457,948 B1 | 11/2008 | Bilicksa et al. |
| 7,472,110 B2 | 12/2008 | Achlioptas |
| 7,478,403 B1 | 1/2009 | Allavarpu |
| 7,490,092 B2 | 2/2009 | Morton et al. |
| 7,499,923 B2 | 3/2009 | Kawatani |
| 7,509,256 B2 | 3/2009 | Iwahashi et al. |
| 7,516,419 B2 | 4/2009 | Petro et al. |
| 7,519,565 B2 | 4/2009 | Prakash et al. |
| 7,523,349 B2 | 4/2009 | Barras |
| 7,558,769 B2 | 7/2009 | Scott et al. |
| 7,571,177 B2 | 8/2009 | Damle |
| 7,574,409 B2 | 8/2009 | Patinkin |
| 7,584,221 B2 | 9/2009 | Robertson et al. |
| 7,603,628 B2 | 10/2009 | Park et al. |
| 7,607,083 B2 | 10/2009 | Gong et al. |
| 7,639,868 B1 | 12/2009 | Regli et al. |
| 7,640,219 B2 | 12/2009 | Perrizo |
| 7,647,345 B2 | 1/2010 | Trespess et al. |
| 7,668,376 B2 | 2/2010 | Lin et al. |
| 7,668,789 B1 * | 2/2010 | Forman ............... G06N 99/005 706/12 |
| 7,698,167 B2 | 4/2010 | Batham et al. |
| 7,712,049 B2 | 5/2010 | Williams et al. |
| 7,716,223 B2 | 5/2010 | Haveliwala et al. |
| 7,730,425 B2 | 6/2010 | de los Reyes et al. |
| 7,743,059 B2 | 6/2010 | Chan et al. |
| 7,756,974 B2 | 7/2010 | Blumenau |
| 7,761,447 B2 | 7/2010 | Brill et al. |
| 7,801,841 B2 | 9/2010 | Mishra et al. |
| 7,831,928 B1 | 11/2010 | Rose et al. |
| 7,885,901 B2 | 2/2011 | Hull et al. |
| 7,899,274 B2 | 3/2011 | Baba et al. |
| 7,971,150 B2 | 6/2011 | Rashutti et al. |
| 7,984,014 B2 | 7/2011 | Song et al. |
| 8,010,466 B2 | 8/2011 | Patinkin |
| 8,010,534 B2 | 8/2011 | Roitblat |
| 8,032,409 B1 | 10/2011 | Mikurak |
| 8,060,259 B2 | 11/2011 | Budhraja et al. |
| 8,065,156 B2 | 11/2011 | Gazdzinski |
| 8,132,121 B2 | 3/2012 | Risch et al. |
| 8,165,974 B2 | 4/2012 | Privault et al. |
| 8,275,773 B2 | 9/2012 | Donnelly et al. |
| 8,290,778 B2 | 10/2012 | Gazdzinski |
| 8,296,146 B2 | 10/2012 | Gazdzinski |
| 8,296,666 B2 | 10/2012 | Wright et al. |
| 8,311,344 B2 | 11/2012 | Dunlop et al. |

(56) References Cited

U.S. PATENT DOCUMENTS

| | | | |
|---|---|---|---|
| 8,326,823 B2* | 12/2012 | Grandhi | G06F 17/3087 345/440 |
| 8,381,122 B2 | 2/2013 | Louch et al. | |
| 8,401,710 B2 | 3/2013 | Budhraja et al. | |
| 8,515,946 B2 | 8/2013 | Marcucci et al. | |
| 8,676,605 B2 | 3/2014 | Familant | |
| 8,712,777 B1 | 4/2014 | Gazdzinski | |
| 8,719,037 B2 | 5/2014 | Gazdzinski | |
| 8,719,038 B1 | 5/2014 | Gazdzinski | |
| 8,781,839 B1 | 7/2014 | Gazdzinski | |
| 8,819,569 B2 | 8/2014 | SanGiovanni et al. | |
| 9,015,633 B2 | 4/2015 | Takamura et al. | |
| 2002/0002556 A1 | 1/2002 | Yoshida et al. | |
| 2002/0016798 A1 | 2/2002 | Sakai | |
| 2002/0032735 A1 | 3/2002 | Burnstein et al. | |
| 2002/0055919 A1 | 5/2002 | Mikheev | |
| 2002/0065912 A1 | 5/2002 | Catchpole et al. | |
| 2002/0078044 A1 | 6/2002 | Song et al. | |
| 2002/0078090 A1 | 6/2002 | Hwang et al. | |
| 2002/0122543 A1 | 9/2002 | Rowen | |
| 2002/0184193 A1 | 12/2002 | Cohen | |
| 2003/0018652 A1 | 1/2003 | Heckerman et al. | |
| 2003/0046311 A1 | 3/2003 | Baidya et al. | |
| 2003/0084066 A1 | 5/2003 | Waterman et al. | |
| 2003/0110181 A1 | 6/2003 | Schuetze et al. | |
| 2003/0120651 A1 | 6/2003 | Bernstein et al. | |
| 2003/0130991 A1 | 7/2003 | Reijerse et al. | |
| 2003/0172048 A1 | 9/2003 | Kauffman | |
| 2003/0174179 A1 | 9/2003 | Suermondt et al. | |
| 2004/0024739 A1 | 2/2004 | Copperman et al. | |
| 2004/0024755 A1 | 2/2004 | Rickard | |
| 2004/0034633 A1 | 2/2004 | Rickard | |
| 2004/0083206 A1 | 4/2004 | Wu et al. | |
| 2004/0090472 A1 | 5/2004 | Risch et al. | |
| 2004/0133650 A1 | 7/2004 | Miloushev et al. | |
| 2004/0163034 A1 | 8/2004 | Colbath | |
| 2004/0172600 A1 | 9/2004 | Evans | |
| 2004/0181427 A1 | 9/2004 | Stobbs et al. | |
| 2004/0205482 A1 | 10/2004 | Basu | |
| 2004/0205578 A1 | 10/2004 | Wolf et al. | |
| 2004/0215608 A1 | 10/2004 | Gourlay | |
| 2004/0243556 A1 | 12/2004 | Ferrucci et al. | |
| 2005/0004949 A1 | 1/2005 | Trepess et al. | |
| 2005/0022106 A1 | 1/2005 | Kawai et al. | |
| 2005/0025357 A1 | 2/2005 | Landwehr et al. | |
| 2005/0091211 A1 | 4/2005 | Vernau et al. | |
| 2005/0097435 A1 | 5/2005 | Prakash et al. | |
| 2005/0171772 A1 | 8/2005 | Iwahashi et al. | |
| 2005/0203924 A1 | 9/2005 | Rosenberg | |
| 2005/0283473 A1 | 12/2005 | Rousso et al. | |
| 2006/0008151 A1 | 1/2006 | Lin et al. | |
| 2006/0012297 A1 | 1/2006 | Lee et al. | |
| 2006/0021009 A1 | 1/2006 | Lunt | |
| 2006/0053382 A1 | 3/2006 | Gardner et al. | |
| 2006/0080311 A1 | 4/2006 | Potok et al. | |
| 2006/0106847 A1 | 5/2006 | Eckardt et al. | |
| 2006/0122974 A1 | 6/2006 | Perisic | |
| 2006/0122997 A1 | 6/2006 | Lin | |
| 2006/0164409 A1 | 7/2006 | Borchardt et al. | |
| 2006/0242013 A1 | 10/2006 | Agarwal et al. | |
| 2007/0020642 A1 | 1/2007 | Deng et al. | |
| 2007/0043774 A1 | 2/2007 | Davis et al. | |
| 2007/0044032 A1 | 2/2007 | Mollitor et al. | |
| 2007/0109297 A1 | 5/2007 | Borchardt et al. | |
| 2007/0112758 A1 | 5/2007 | Livaditis | |
| 2007/0150801 A1 | 6/2007 | Chidlovskii et al. | |
| 2007/0214133 A1 | 9/2007 | Liberty et al. | |
| 2007/0288445 A1 | 12/2007 | Kraftsow | |
| 2008/0005081 A1 | 1/2008 | Green et al. | |
| 2008/0109762 A1 | 5/2008 | Hundal et al. | |
| 2008/0140643 A1 | 6/2008 | Ismalon | |
| 2008/0162478 A1 | 7/2008 | Pugh et al. | |
| 2008/0183855 A1 | 7/2008 | Agarwal et al. | |
| 2008/0189273 A1 | 8/2008 | Kraftsow | |
| 2008/0215427 A1 | 9/2008 | Kawada et al. | |
| 2008/0228675 A1 | 9/2008 | Daffy et al. | |
| 2008/0249999 A1 | 10/2008 | Renders et al. | |
| 2009/0018995 A1* | 1/2009 | Chidlovskii | G06K 9/622 707/999.002 |
| 2009/0041329 A1 | 2/2009 | Nordell et al. | |
| 2009/0043797 A1 | 2/2009 | Dorie | |
| 2009/0049017 A1 | 2/2009 | Gross | |
| 2009/0097733 A1 | 4/2009 | Hero et al. | |
| 2009/0106239 A1 | 4/2009 | Getner et al. | |
| 2009/0125505 A1 | 5/2009 | Bhalotia et al. | |
| 2009/0222444 A1 | 9/2009 | Chowdhury et al. | |
| 2009/0228499 A1 | 9/2009 | Schmidtle et al. | |
| 2009/0228811 A1 | 9/2009 | Adams et al. | |
| 2009/0259622 A1* | 10/2009 | Kolz | G06F 17/30327 707/999.003 |
| 2009/0265631 A1 | 10/2009 | Sigurbjornsson et al. | |
| 2009/0307213 A1 | 12/2009 | Deng et al. | |
| 2010/0076857 A1 | 3/2010 | Deo et al. | |
| 2010/0100539 A1 | 4/2010 | Davis et al. | |
| 2010/0198802 A1 | 8/2010 | Kraftsow | |
| 2010/0250477 A1 | 9/2010 | Yadav | |
| 2010/0250541 A1 | 9/2010 | Richards et al. | |
| 2010/0262571 A1 | 10/2010 | Schmidtler et al. | |
| 2010/0268661 A1 | 10/2010 | Levy et al. | |
| 2010/0312725 A1 | 12/2010 | Privault et al. | |
| 2011/0016118 A1 | 1/2011 | Edala et al. | |
| 2012/0124034 A1 | 5/2012 | Jing et al. | |
| 2014/0156711 A1* | 6/2014 | Sharan | G06F 17/30294 707/804 |

FOREIGN PATENT DOCUMENTS

| | | |
|---|---|---|
| EP | 1049030 | 11/2000 |
| WO | 200067162 | 11/2000 |
| WO | 2003052627 | 6/2003 |
| WO | 2003060766 | 7/2003 |
| WO | 2006008733 | 7/2004 |
| WO | 2005073881 | 8/2005 |

OTHER PUBLICATIONS

Anna Sachinopoulou, "Multidimensional Visualization," Technical Research Centre of Finland, ESPOO 2001, VTT Research Notes 2114, pp. 1-37 (2001).

B.B. Hubbard, "The World According the Wavelet: The Story of a Mathematical Technique in the Making," AK Peters (2nd ed.), pp. 227-229, Massachusetts, USA (1998).

Baeza-Yates et al., "Modern Information Retrieval," Ch. 2 "Modeling," Modern Information Retrieval, Harlow: Addison-Wesley, Great Britain 1999, pp. 18-71 (1999).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809, IS.

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Boukhelifa et al., "A Model and Software System for Coordinated and Multiple Views in Exploratory Visualization," Information Visualization, No. 2, pp. 258-269, GB (2003).

C. Yip Chung et al., "Thematic Mapping-From Unstructured Documents to Taxonomies," CIKM'02, Nov. 4-9, 2002, pp. 608-610, ACM, McLean, Virginia, USA (Nov. 4, 2002).

Chen An et al., "Fuzzy Concept Graph and Application in Web Document Clustering," IEEE, pp. 101-106 (2001).

Davison et al., "Brute Force Estimation of the Number of Human Genes Using EST Clustering as a Measure," IBM Journal of Research & Development, vol. 45, pp. 439-447 (May 2001).

Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190, Sep. 18, 1996—Se.

Eades et al., "Orthogonal Grid Drawing of Clustered Graphs," Department of Computer Science, the University of Newcastle,

(56) References Cited

OTHER PUBLICATIONS

Australia, Technical Report 96-04, [Online] 1996, Retrieved from the internet: URL:http://citeseer.ist.psu.edu/eades96ort hogonal.ht.
Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, N.
F. Can, Incremental Clustering for Dynamic Information Processing: ACM Transactions on Information Systems, ACM, New York, NY, US, vol. 11, No. 2, pp. 143-164, XP-002308022 (Apr. 1993).
Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).
http://em-ntserver.unl.edu/Math/mathweb/vecors/vectors.html © 1997.
Inxight VizServer, "Speeds and Simplifies the Exploration and Sharing of Information", www.inxight.com/products/vizserver, copyright 2005.
Jain et al., "Data Clustering: A Review," ACM Computing Surveys, vol. 31, No. 3, Sep. 1999, pp. 264-323, New York, NY, USA (Sep. 1999).
James Osborn et al., "JUSTICE: A Jidicial Search Tool Using Intelligent Cencept Extraction," Department of Computer Science and Software Engineering, University of Melbourne, Australia, ICAIL-99, 1999, pp. 173-181, ACM (1999).
Jiang Linhui, "K-Mean Algorithm: Iterative Partitioning Clustering Algorithm," http://www.cs.regina.ca/-linhui/K.sub.--mean.sub.--algorithm.html, (2001) Computer Science Department, University of Regina, Saskatchewan, Canada (2001).
Kanungo et al., "The Analysis of a Simple K-Means Clustering Algorithm," pp. 100-109, PROC 16th annual symposium of computational geometry (May 2000).
S.S. Weng, C.K. Liu, "Using text classification and multiple concepts to answer e-mails." Expert Systems with Applications, 26 (2004), pp. 529-543.
Slaney, M., et al., "Multimedia Edges: Finding Hierarchy in all Dimensions" PROC. 9-th ACM Intl. Conf. on Multimedia, pp. 29-40, ISBN. 1-58113-394-4, Sep. 30, 2001, XP002295016 Ottawa (Sep. 3, 2001).
Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).
Sullivan, Dan., "Document Warehousing and Text Mining: Techniques for Improving Business Operations, Marketing and Sales," Ch. 1-3, John Wiley & Sons, New York, NY (2001).
V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).
Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).
Whiting et al., "Image Quantization: Statistics and Modeling," SPIE Conference of Physics of Medical Imaging, San Diego, CA, USA, vol. 3336, pp. 260-271 (Feb. 1998).
Ryall et al., "An Interactive Constraint-Based System for Drawing Graphs," UIST '97 Proceedings of the 10th Annual ACM Symposium on User Interface Software and Technology, pp. 97-104 (1997).
O'Neill et al., "DISCO: Intelligent Help for Document Review," 12th International Conference on Artificial Intelligence and Law, Barcelona, Spain, Jun. 8, 2009, pp. 1-10, ICAIL 2009, Association for Computing Machinery, Red Hook, New York (Online); XP 002607216.
McNee, "Meeting User Information Needs in Recommender Systems," Ph.D. Dissertation, University of Minnesota—Twin Cities, Jun. 2006.
Kawano, Hiroyuki., "Overview of Mondou Web Search Engine Using Text Mining and Information Visualizing Technologies," IEEE, 2001, pp. 234-241.
Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).
Kohonen, T., "Self-Organizing Maps," Ch. 1-2, Springer-Verlag (3rd ed.) (2001).
Kurimo M., "Fast Latent Semantic Indexing of Spoken Documents by Using Self-Organizing Maps" IEEE International Conference on Accoustics, Speech, and Signal Processing, vol. 6, pp. 2425-2428 (Jun. 2000).
Lam et al., "A Sliding Window Technique for Word Recognition," SPIE, vol. 2422, pp. 38-46, Center of Excellence for Document Analysis and Recognition, State University of New Yrok at Baffalo, NY, USA (1995).
Lio et al., "Funding Pathogenicity Islands and Gene Transfer Events in Genome Data," Bioinformatics, vol. 16, pp. 932-940, Department of Zoology, University of Cambridge, UK (Jan. 25, 2000).
Artero et al., "Viz3D: Effective Exploratory Visualization of Large Multidimensional Data Sets," IEEE Computer Graphics and Image Processing, pp. 340-347 (Oct. 20, 2004).
Magarshak, Greg., Theory & Practice. Issue 01. May 17, 2000. http://www.flipcode.com/articles/tp.sub.--issue01-pf.shtml (May 17, 2000).
Maria Cristin Ferreira de Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).
Rauber et al., "Text Mining in the SOMLib Digital Library System: The Representation of Topics and Genres," Applied Intelligence 18, pp. 271-293, 2003 Kluwer Academic Publishers (2003).
Miller et al., "Topic Islands: A Wavelet Based Text Visualization System," Proceedings of the IEEE Visualization Conference. 1998, pp. 189-196.
North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).
Shuldberg et al., "Distilling Information from Text: The EDS TemplateFiller System," Journal of the American Society for Information Science, vol. 44, pp. 493-507 (1993).
Pelleg et al., "Accelerating Exact K-Means Algorithms With Geometric Reasoning," pp. 277-281, CONF on Knowledge Discovery in Data, PROC fifth ACM SIGKDD (1999).
R.E. Horn, "Communication Units, Morphology, and Syntax," Visual Language: Global Communication for the 21st Century, 1998, Ch. 3, pp. 51-92, MacroVU Press, Bainbridge Island, Washington, USA.
Paul N. Bennett et al., Probabilistic Combination of Text Classifiers Using Reliability Indicators, 2002, ACM, 8 pages.
DeLoura et al., Game Programming Gems 2, Charles River Media, Inc., pp. 182-190, 2001.
R.E.Horn, "Visual Language: Global Communication for the 21st Century ," 1998, pp. 51-92, Bainbridge, Washington, USA.
Salton G. et al., "Extended Boolean Information Retrieval" Communications of the Association for Computing Machinery, ACM, New York, NY, US., vol. 26, p. 12, Nov. 1, 1983, pig1022-1036, XP000670417.
Cutting, Douglass R., et al. "Scatter/gather: A cluster-based approach to browsing large document collections." Proceedings of the 15th annual international ACM SIGIR conference on Research and development in information retrieval. ACM, 1992.

* cited by examiner

COMPUTER-IMPLEMENTED SYSTEM AND METHOD FOR ASSIGNING CONCEPT CLASSIFICATION SUGGESTIONS

CROSS-REFERENCE TO RELATED APPLICATION

This patent application is a continuation of U.S. Pat. No. 9,064,008, issued Jun. 23, 2015, which claims priority to U.S. Pat. No. 8,515,958 issued Aug. 20, 2013; which claims priority under 35 U.S.C. § 119(e) to U.S. Provisional Patent Application, Ser. No. 61/229,216, filed Jul. 28, 2009, and U.S. Provisional Patent Application, Ser. No. 61/236,490, filed Aug. 24, 2009, the disclosures of which are incorporated by reference.

FIELD

This application relates in general to information classification, in particular, to a system and method for assigning concept classification suggestions.

BACKGROUND

Historically, document review during the discovery phase of litigation and for other types of legal matters, such as due diligence and regulatory compliance, have been conducted manually. During document review, individual reviewers, generally licensed attorneys, are typically assigned sets of documents for coding. A reviewer must carefully study each document and categorize the document by assigning a code or other marker from a set of descriptive classifications, such as "privileged," "responsive," and "non-responsive." The classifications can affect the disposition of each document, including admissibility into evidence. As well, during discovery, document review can potentially affect the outcome of the legal underlying matter, and consistent and accurate results are crucial.

Manual document review is tedious and time-consuming. Marking documents is performed at the sole discretion of each reviewer and inconsistent results can occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, coding categories, and review techniques.

Currently, with the increasingly widespread movement to electronically stored information (ESI), manual document review is becoming impracticable and outmoded. The often exponential growth of ESI can exceed the bounds reasonable for conventional manual human review and the sheer scale of staffing ESI review underscores the need for computer-assisted ESI review tools.

Conventional ESI review tools have proven inadequate for providing efficient, accurate, and consistent results. For example, DiscoverReady LLC, a Delaware limited liability company, conducts semi-automated document review through multiple passes over a document set in ESI form. During the first pass, documents are grouped by category and basic codes are assigned. Subsequent passes refine and assign further encodings. Multiple pass ESI review also requires a priori project-specific knowledge engineering, which is generally applicable to only a single project, thereby losing the benefit of any inferred knowledge or experiential know-how for use in other review projects.

Thus, there remains a need for a system and method for increasing the efficiency of document review by providing classification suggestions based on reference documents while ultimately ensuring independent reviewer discretion.

SUMMARY

Document review efficiency can be increased by identifying relationships between reference concepts, which are concepts that have been assigned classification codes, and uncoded concepts and providing a suggestion for classification based on the classification relationships. Uncoded concepts are formed into conceptual clusters. The uncoded concepts for a cluster are compared to a set of reference concepts. Those reference concepts most similar to the uncoded concepts are identified based on, for instance, semantic similarity and are used to form a classification suggestion. The classification suggestion can be provided with a confidence level that reflects the amount of similarity between the uncoded concepts and reference concepts in the neighborhood. The classification suggestion can then be accepted, rejected, or ignored by a reviewer.

An embodiment provides a computer-implemented system and method for assigning concept classification suggestions. One or more clusters of concepts is accessed. The concepts include uncoded concepts and one or more reference concepts selected from a set of reference concepts. Each reference concept is associated with a classification code. One of the uncoded concepts is selected for classification in one such cluster. At least one of the reference concepts located closest to the selected uncoded concept is identified. The classification code of the closest located reference concept is assigned to the selected uncoded concept as a suggested classification code.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
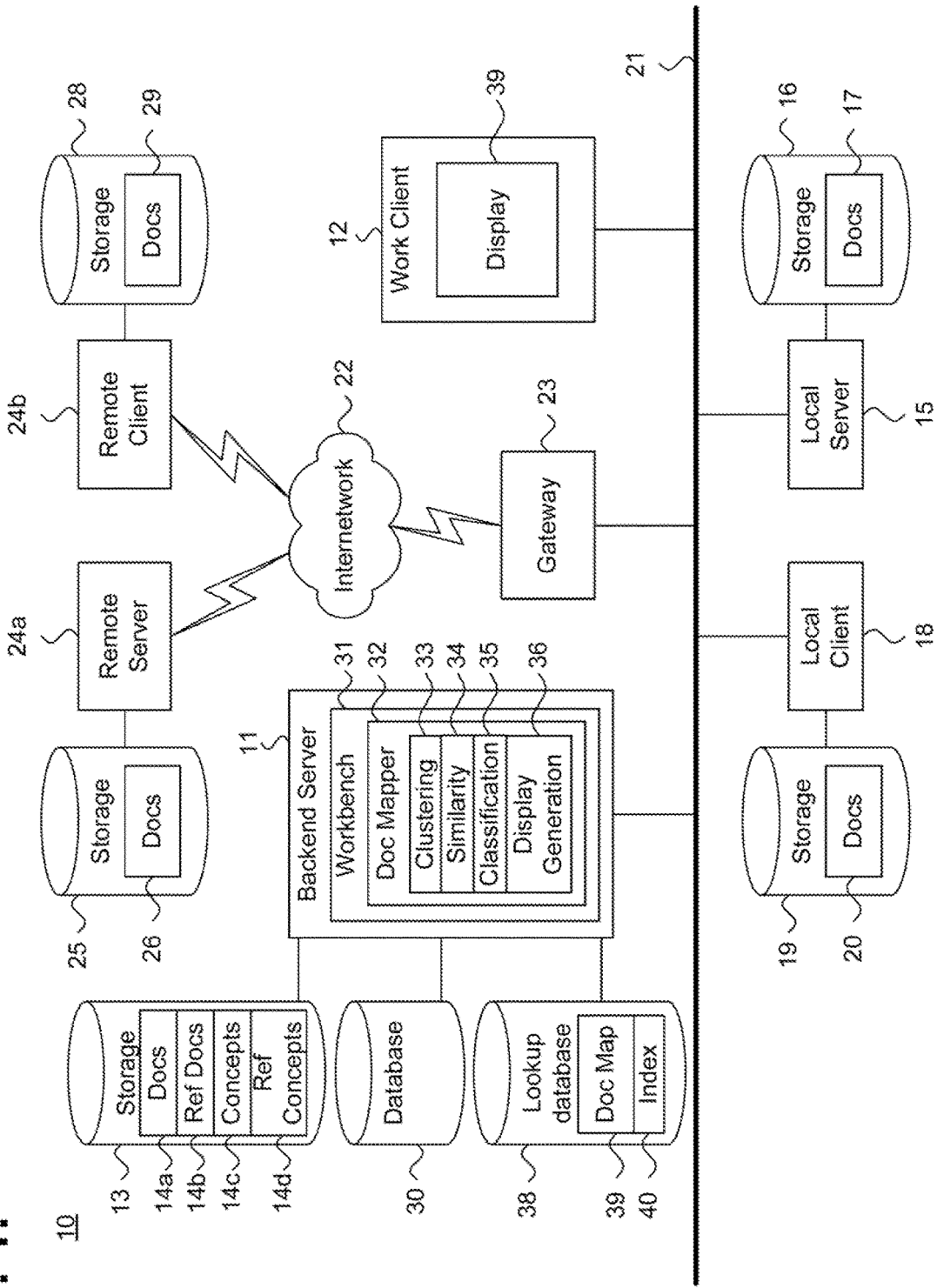
FIG. 1 is a block diagram showing a system for providing reference concepts as a suggestion for uncoded concepts, in accordance with one embodiment.

The ever-increasing volume of ESI underlies the need for automating document review for improved consistency and throughput. Token clustering via injection utilizes reference, or previously classified tokens, which offer knowledge gleaned from earlier work in similar legal projects, as well as a reference point for classifying uncoded tokens.

The tokens can include word-level, symbol-level, or character-level n-grams, raw terms, entities, or concepts. Other tokens, including other atomic parse-level elements, are possible. An n-gram is a predetermined number of items selected from a source. The items can include syllables, letters, or words, as well as other items. A raw term is a term that has not been processed or manipulated. Entities further refine nouns and noun phrases into people, places, and things, such as meetings, animals, relationships, and various other objects. Additionally, entities can represent other parts of grammar associated with semantic meanings to disambiguate different instances or occurrences of the grammar. Entities can be extracted using entity extraction techniques known in the field.

Concepts are collections of nouns and noun-phrases with common semantic meaning that can be extracted from ESI, including documents, through part-of-speech tagging. Each concept can represent one or more documents to be classified during a review. Clustering of the concepts provides an overall view of the document space, which allows users to easily identify documents sharing a common theme.

The clustering of tokens, for example, concepts, differs from document clustering, which groups related documents individually. In contrast, concept clustering groups related concepts, which are each representative of one or more related documents. Each concept can express an ideas or topic that may not be expressed by individual documents. A concept is analogous to a search query by identifying documents associated with a particular idea or topic.

A user can determine how particular concepts are related based on the concept clustering. Further, users are able to intuitively identify documents by selecting one or more associated concepts in a cluster. For example, a user may wish to identify all documents in a particular corpus that are related to car manufacturing. The user can select the concept "car manufacturing" or "vehicle manufacture" within one of the clusters and subsequently, the associated documents are presented. However, during document clustering, a user is first required to select a specific document from which other documents that are similarly related can then be identified.

Providing Classification Suggestions Using Reference Concepts

Reference tokens are previously classified based on the document content represented by that token and can be injected into clusters of uncoded, that is unclassified, tokens to influence classification of the uncoded tokens. Specifically, relationships between an uncoded token and the reference tokens, in terms of semantic similarity or distinction, can be used as an aid in providing suggestions for classifying uncoded tokens. Once classified, the newly-coded, or reference, tokens can be used to further classify the represented documents. Although tokens, such as word-level or character-level n-grams, raw terms, entities, or concepts, can be clustered and displayed, the discussion below will focus on a concept as a particular token.

End-to end ESI review requires a computerized support environment within which classification can be performed. FIG. 1 is a block diagram showing a system 10 for providing reference concepts as a suggestion for uncoded concepts, in accordance with one embodiment. By way of illustration, the system 10 operates in a distributed computing environment, which includes a plurality of heterogeneous systems and ESI sources. Henceforth, a single item of ESI will be referenced as a "document," although ESI can include other forms of non-document data, as described infra. A backend server 11 is coupled to a storage device 13, which stores documents 14a in the form of structured or unstructured data, a database 30 for maintaining information about the documents, and a look up database 37 for storing many-to-many mappings 38 between documents and document features, such as concepts, and a concept document index 40, which maps documents to concepts. The storage device 13 also stores reference documents 14b, which provide a training set of trusted and known results for use in guiding ESI classification. The reference documents 14b can be hand-selected or automatically determined. Additionally, the set of reference documents can be predetermined or can be generated dynamically, as the selected uncoded documents are classified and subsequently added to the set of reference documents. Further, the backend server 11 can store uncoded concepts 14c and reference concepts 14d. Concepts are collections of nouns and noun-phrases with common semantic meaning. The nouns and noun-phrases can be extracted from one or more documents in the corpus for review. Hereinafter, the terms "classified" and "coded" are used interchangeably with the same intended meaning, unless otherwise indicated.

The backend server 11 is coupled to an intranetwork 21 and executes a workbench software suite 31 for providing a user interface framework for automated document management, processing, analysis, and classification. In a further embodiment, the backend server 11 can be accessed via an internetwork 22. The workbench suite 31 includes a document mapper 32 that includes a clustering engine 33, similarity searcher 34, classifier 35, and display generator 36. Other workbench suite modules are possible.

The clustering engine 33 performs efficient concept scoring and clustering of uncoded concepts, such as described in commonly-assigned U.S. Pat. No. 7,610,313, issued Oct. 27, 2009; U.S. Pat. No. 8,700,627, issued Apr. 15, 2014; U.S. Patent Application Publication No. 2011/0029530, published Feb. 3, 2011, pending, and U.S. Pat. No. 8,645,378, issued Feb. 4, 2014, the disclosures of which is incorporated by reference.

Briefly, clusters of uncoded concepts 14c are formed and can be organized along vectors, known as spines, based on a similarity of the clusters. The similarity can be expressed in terms of distance. The uncoded concepts 14c are identified from a corpus of uncoded documents for a document review project. In a further embodiment, the cluster set of uncoded concepts can be predetermined based on a related document review project.

The similarity searcher 34 identifies the reference concepts 14d that are similar to selected uncoded concepts 14c, clusters, or spines. The classifier 35 provides a machine-generated suggestion and confidence level for classification of the selected uncoded concepts 14c, clusters, or spines, as further described below beginning with reference to FIG. 2.

The display generator 36 arranges the clusters and spines in thematic or conceptual relationships in a two-dimensional visual display space. Once generated, the visual display space is transmitted to a work client 12 by the backend server 11 via the document mapper 32 for presenting to a reviewer. The reviewer can include an individual person who is assigned to review and classify the concepts 14c by designating a code. Hereinafter, unless otherwise indicated, the terms "reviewer" and "custodian" are used interchangeably with the same intended meaning. Other types of reviewers are possible, including machine-implemented reviewers.

The document mapper 32 operates on uncoded concepts 14c, which can be retrieved from the storage 13, as well as a plurality of local and remote sources. The local and remote sources can also store the reference concepts 14d, as well as the uncoded documents 14a and reference documents 14b. The local sources include documents and concepts 17 maintained in a storage device 16 coupled to a local server 15 and documents 20 maintained in a storage device 19 coupled to a local client 18. The local server 15 and local client 18 are interconnected to the backend server 11 and the work client 12 over the intranetwork 21. In addition, the document mapper 32 can identify and retrieve documents from remote sources over the internetwork 22, including the Internet, through a gateway 23 interfaced to the intranetwork 21. The remote sources include documents 26 maintained in a storage device 25 coupled to a remote server 24a and documents 29 maintained in a storage device 28 coupled to a remote client 24b. Other document and concept sources, either local or remote, are possible.

The individual documents 14a, 14b, 17, 20, 26, 29 include all forms and types of structured and unstructured ESI including electronic message stores, word processing documents, electronic mail (email) folders, Web pages, and graphical or multimedia data. Notwithstanding, the documents could be in the form of structurally organized data, such as stored in spreadsheets or databases.

In one embodiment, the individual documents 14a, 14b, 17, 20, 26, 29 can include electronic message folders storing email and attachments, such as maintained by the Outlook and Outlook Express products, licensed by Microsoft Corporation, Redmond, Wash. The database can be on SQL-based relational database, such as the Oracle database management system, Release 8, licensed by Oracle Corporation, Redwood Shores, Calif.

Additionally, the individual documents 17, 20, 26, 29 include uncoded documents, reference documents, and previously uncoded documents that have been assigned a classification code. The number of uncoded documents may be too large for processing in a single pass. Typically, a subset of uncoded documents are selected for a document review assignment and stored as a document corpus, which can also include one or more reference documents as discussed infra.

Moreover, the individual concepts 14c, 14d, 17, 20, 26, 29 include uncoded concepts and reference concepts. The uncoded concepts, which are unclassified, represent collections of nouns and noun-phrases that are semantically related and extracted from documents in a document review project.

The reference concepts are initially uncoded concepts that can be selected from the corpus or other source of uncoded concepts and subsequently classified. When combined with uncoded concepts, such as described in commonly-assigned U.S. Pat. No. 8,700,627, issued Apr. 15, 2014; U.S. Patent Application Publication No. 2011/0029530, published Feb. 3, 2011, pending, and U.S. Pat. No. 8,645,378, issued Feb. 4, 2014, the disclosures of which are incorporated by reference, the reference concepts can provide suggestions for classification of the remaining uncoded concepts in the corpus based on visual relationships between the reference concepts and uncoded concepts. The reviewer can classify one or more of the uncoded concepts by assigning a code to each concept, representing a classification, based on the suggestions, if desired. The suggestions can also be used for other purposes, such as quality control. Concepts given a classification code by the reviewer are then stored. Additionally, the now-coded concepts can be used as reference concepts in related document review assignments. The assignment is completed once all uncoded concepts in the assignment have been assigned a classification code.

In a further embodiment, the reference concepts can be used as a training set to form machine-generated suggestions for classifying uncoded concepts. The reference concepts are representative of the document corpus for a review project in which data organization or classification is desired. A set of reference concepts can be generated for each document review project or alternatively, the reference concepts can be representative of documents selected from a previously conducted document review project that is related to the current document review project. Guided review assists a reviewer in building a reference concept set representative of the corpus for use in classifying uncoded documents. Alternatively, the reference concept set can be selected from a previously conducted document review that is related to the current document review project.

During guided review, uncoded concepts that are dissimilar to each other are identified based on a similarity threshold. Other methods for determining dissimilarity are possible. Identifying a set of dissimilar concepts provides a group of concepts that is representative of the corpus for a document review project. Each identified dissimilar concept is then classified by assigning a particular code based on the content of the concept to generate a set of reference concepts for the document review project. Guided review can be performed by a reviewer, a machine, or a combination of the reviewer and machine.

Other methods for generating a reference concept set for a document review project using guided review are possible, including clustering. A set of uncoded concepts to be classified can be clustered, such as described in commonly-assigned U.S. Pat. No. 8,700,627, issued Apr. 15, 2014; U.S. Patent Application Publication No. 2011/0029530, published Feb. 3, 2011, pending, and U.S. Pat. No. 8,645,378, issued Feb. 4, 2014, the disclosures of which are incorporated by reference.

Briefly, a plurality of the clustered uncoded concepts is selected based on selection criteria, such as cluster centers or sample clusters. The cluster centers can be used to identify uncoded concepts in a cluster that are most similar or dissimilar to the cluster center. The identified uncoded concepts are then selected for classification. After classification, the previously uncoded concepts represent a reference set. In a further example, sample clusters can be used to generate a reference set by selecting one or more sample clusters based on cluster relation criteria, such as size, content, similarity, or dissimilarity. The uncoded concepts in the selected sample clusters are then selected for classification by assigning codes. The classified concepts represent a reference concept set for the document review project. Other methods for selecting uncoded concepts for use as a reference set are possible. Although the above process has been described with reference to concepts, other objects or tokens are possible.

For purposes of legal discovery, the codes used to classify uncoded concepts can include "privileged," "responsive," or "non-responsive." Other codes are possible. The assigned classification codes can be used as suggestions for classification of associated documents. For example, a document associated with three concepts, each assigned a "privileged" classification can also be considered "privileged." Other types of suggestions are possible. A "privileged" document contains information that is protected by a privilege, meaning that the document should not be disclosed or "produced" to an opposing party. Disclosing a "privileged" document can result in an unintentional waiver of the subject matter disclosed. A "responsive" document contains information that is related to the legal matter, while a "non-responsive" document includes information that is not related to the legal matter.

Obtaining reference sets and cluster sets, and identifying the most similar reference concepts can be performed by the system 10, which includes individual computer systems, such as the backend server 11, work server 12, server 15, client 18, remote server 24a and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display 39. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Figure 2:
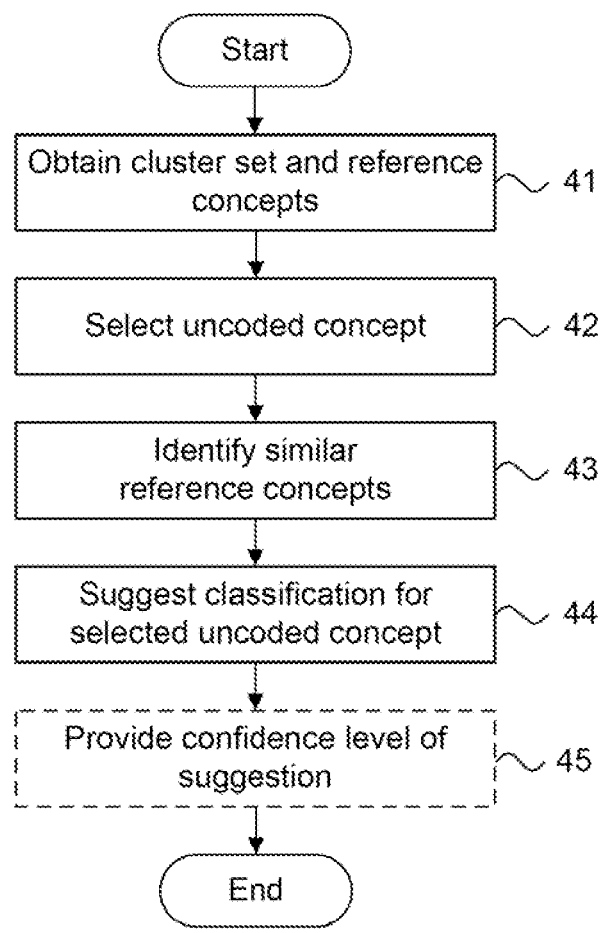
FIG. 2 is a process flow diagram showing a method for providing a classification suggestion for uncoded concepts, in accordance with one embodiment.

Classification code suggestions associated with a confidence level can be provided to assist a reviewer in making classification decisions for uncoded concepts. FIG. 2 is a process flow diagram showing a method for providing a classification suggestion for uncoded concepts, in accordance with one embodiment. A set of uncoded concepts is first identified, then clustered, based on thematic or conceptual relationships (block 41). The clusters can be generated on-demand or previously-generated and stored, as described in commonly-assigned U.S. Pat. No. 7,610,313, the disclosure of which is incorporated by reference.

Once obtained, an uncoded concept within one of the clusters is selected (block 42). A neighborhood of reference concepts that is most relevant to the selected uncoded concept is identified (block 43). Determining the neighborhood of the selected uncoded concept is further discussed below with reference to FIG. 5. The neighborhood of reference concepts is determined separately for each cluster and can include one or more reference concepts within that cluster. The number of reference concepts in a neighborhood can be determined automatically or by an individual reviewer. In a further embodiment, the neighborhood of reference concepts is defined for each available classification code or subset of class codes. A classification for the selected uncoded concept is suggested based on the classification of the similar coded reference concepts in the neighborhood (block 44). The suggested classification can then be accepted, rejected, or ignored by the reviewer, as further described below with reference to FIG. 4. Optionally, a confidence level for the suggested classification can be provided (block 45), as further described below with reference to FIG. 3.

Figure 3:
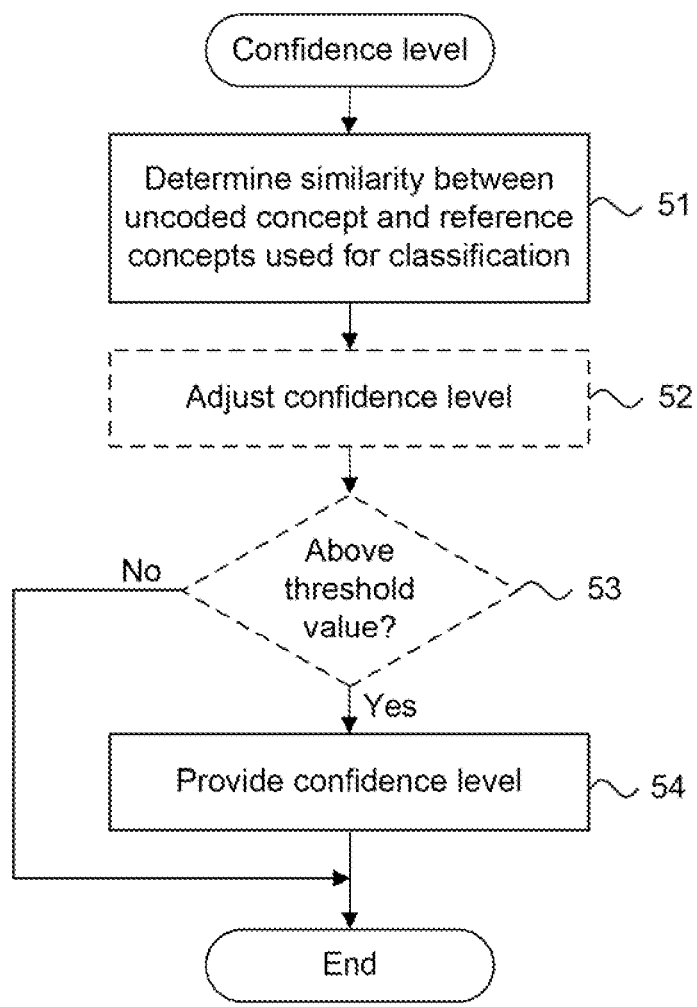
FIG. 3 is a process flow diagram showing a method for providing a confidence level for a classification suggestion for use in the method of FIG. 2.
Figure 5:
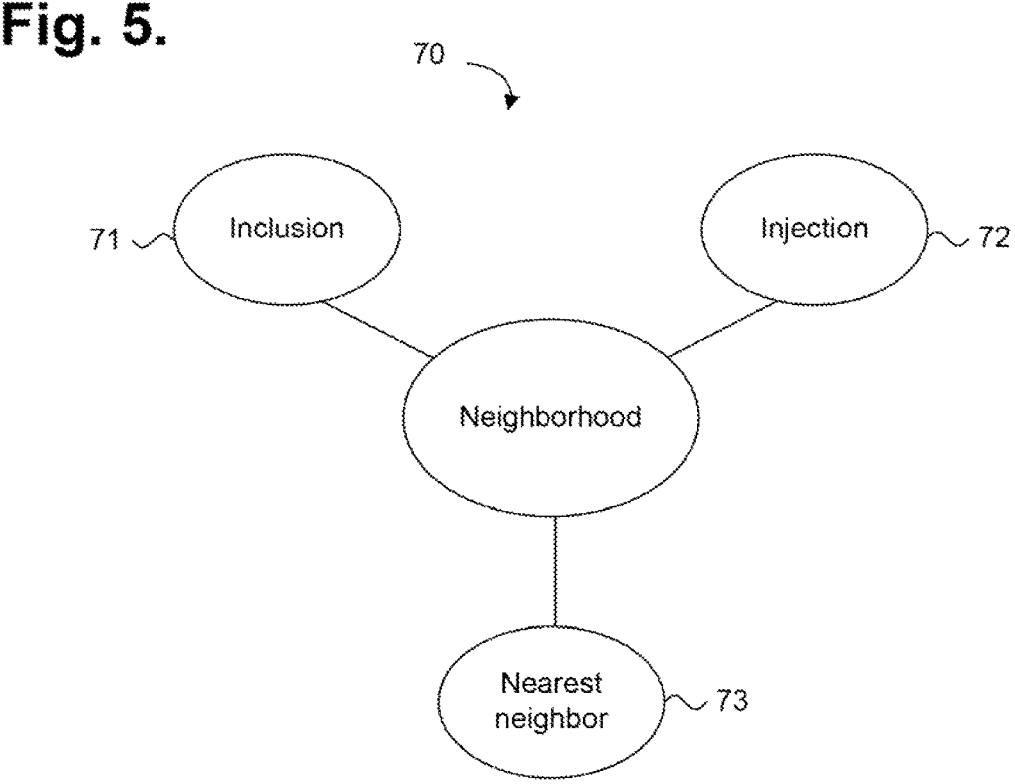
FIG. 5 is a block diagram showing, by way of example, ways to generate a neighborhood of reference concepts for a clustered uncoded concept for use in the method of FIG. 2.

The machine-generated suggestion for classification and associated confidence level can be determined by the classifier as further discussed below with reference to FIGS. 3 and 5. Once generated, the reference concepts in the neighborhood and the selected uncoded concept are analyzed to provide a classification suggestion. The analysis of the selected uncoded concept and neighborhood reference concepts can be based on one or more routines performed by the classifier, such as a nearest neighbor (NN) classifier, as further discussed below with reference to FIG. 5. The classification suggestion is displayed to the reviewer through visual display, such as textually or graphically, or other ways of display. For example, the suggestion can be displayed as part of a visual representation of the uncoded concept, as further discussed below with reference to FIGS. 7 and 8, and as described in commonly-assigned U.S. Pat. No. 7,271,804, the disclosure of which is incorporated by reference.

In a further embodiment, the classified concepts can be used to classify those documents represented by that concept. For example, in a product liability lawsuit, the plaintiff claims that a wood composite manufactured by the defendant induces and harbors mold growth. During discovery, all documents within the corpus for the lawsuit and relating to mold should be identified for review. The concept for mold is clustered and includes a "responsive" classification code, which indicates that the noun phrase mold is related to the legal matter. Upon selection of the mold concept, all documents that include the noun phrase mold can be identified using the mapping matrix, which is described further below with reference to FIG. 9. The responsive classification code assigned to the concept can be used as a suggestion for the document classification. However, if the document is represented by multiple concepts with different classification codes, each different code can be considered during classification of the document.

In a further embodiment, the concept clusters can be used with document clusters, which are described in commonly-owned in U.S. Pat. No. 8,713,018 issued Apr. 29, 2014, and U.S. Pat. No. 8,515,957 issued Aug. 20, 2013, the disclosures of which is incorporated by reference. For example, selecting a concept in the concept cluster display can identify one or more documents with a common idea or topic. Further selection of one of the documents represented by the selected cluster in the document concept display can identify documents that are similarly related to the content of the selected document. The identified documents can be the same or different as the other documents represented by the concept.

Similar documents can also be identified as described in commonly-assigned U.S. Pat. No. 8,572,084, issued Oct. 29, 2013, the disclosure of which is incorporated by reference.

In an even further embodiment, the documents identified from one of the concepts can be classified automatically as described in commonly-assigned U.S. Pat. No. 8,635,223, issued Jan. 21, 2014, the disclosure of which is incorporated by reference.

Once the suggested classification code is provided for the selected uncoded concept, the classifier can provide a confidence level for the suggested classification, which can be presented as an absolute value or percentage. FIG. 3 is a process flow diagram showing a method for providing a confidence level for a classification suggestion for use in the method of FIG. 2. The confidence level is determined from a distance metric based on the amount of similarity of the uncoded concept to the reference documents used for the classification suggestion (block 51). In one embodiment, the similarity between each reference concept in the neighborhood and the selected uncoded concept is determined as the cos σ of the score vectors for the concept and each reference concept being compared. The cos σ provides a measure of relative similarity or dissimilarity between tokens, including the concepts in the documents and is equivalent to the inner products between the score vectors for the uncoded document and the reference document.

In the described embodiment, the cos σ is calculated in accordance with the equation:

$$\cos\sigma_{AB} = \frac{\langle \vec{S}_A \cdot \vec{S}_B \rangle}{|\vec{S}_A||\vec{S}_B|}$$

where $\cos\sigma_{AB}$ comprises the similarity metric between uncoded concept A and reference concept B, $\vec{S}_A$ comprises a score vector for the uncoded concept A, and $\vec{S}_B$ comprises a score vector for the reference concept B. Other forms of determining similarity using a distance metric are feasible, as would be recognized by one skilled in the art, such as using Euclidean distance. Practically, a reference concept in the neighborhood that is identical to the uncoded concept would result in a confidence level of 100%, while a reference concept that is completely dissimilar would result in a confidence level of 0%.

Alternatively, the confidence level can take into account the classifications of reference concepts in the neighborhood that are different than the suggested classification and adjust the confidence level accordingly (block 52). For example, the confidence level of the suggested classification can be reduced by subtracting the calculated similarity metric of the unsuggested classification from the similarity metric of the reference concept of the suggested classification. Other confidence level measures are possible. The reviewer can consider confidence level when assigning a classification to a selected uncoded concept. Alternatively, the classifier can automatically assign the suggested classification upon determination. In one embodiment, the classifier only assigns an uncoded concept with the suggested classification if the confidence level is above a threshold value (block 53), which can be set by the reviewer or the classifier. For example, a confidence level of more than 50% can be required for a classification to be suggested to the reviewer. Finally, once determined, the confidence level for the suggested classification is provided to the reviewer (block 54).

Figure 4:
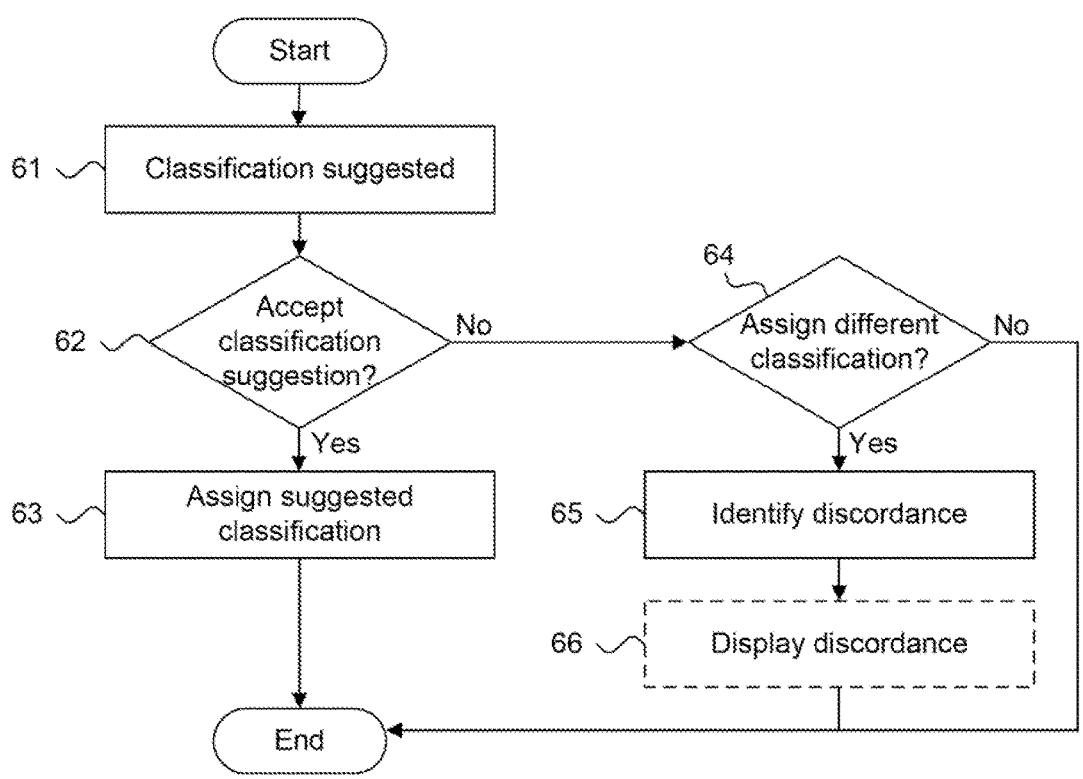
FIG. 4 is a process flow diagram showing a method for accepting or rejecting a classification suggestion for use in the method of FIG. 2.

The suggested classification can be accepted, rejected, or ignored by the reviewer. FIG. 4 is a process flow diagram showing a method for accepting or rejecting a classification suggestion for use in the method of FIG. 2. Once the classification has been suggested (block 61), the reviewer can accept or reject the suggestion (block 62). If accepted, the previously uncoded concept is coded with the suggested classification (block 63). Additionally, the now-coded concept can be stored as a coded concept. In a further embodiment, the suggested classification is automatically assigned to the uncoded concept, as further described below with reference to FIG. 6. If rejected, the uncoded concept remains uncoded and can be manually classified by the reviewer under a different classification code (block 64). Once the selected uncoded concept is assigned a classification code, either by the reviewer or automatically, the newly classified concept can be added to the set of reference concepts for use in classifying further uncoded concepts. Subsequently, a further uncoded concept can be selected for classification using similar reference concepts.

In a further embodiment, if the manual classification is different from the suggested classification, a discordance is identified by the system (block 65). Optionally, the discordance can be visually depicted to the reviewer (block 66). For example, the discordance can be displayed as part of a visual representation of the discordant document, as further discussed below with reference to FIG. 8. Additionally, the discordance is flagged if a discordance threshold value is exceeded, which can be set by the reviewer or the classifier. The discordance threshold is based on the confidence level. In one embodiment, the discordance value is identical to the confidence level of the suggested classification. In a further embodiment, the discordance value is the difference between the confidence level of the suggested classification and the confidence level of the manually-assigned classification.

In a yet further embodiment, an entire cluster, or a cluster spine containing multiple clusters of uncoded documents can be selected and a classification for the entire cluster or cluster spine can be suggested. For instance, for cluster classification, a cluster is selected and a score vector for the center of the cluster is determined as described in commonly-assigned U.S. Pat. No. 8,700,627 issued Apr. 15, 2014; published Feb. 3, 2011, pending, U.S. Patent Application Publication No. 2011/0029530, published Feb. 3, 2011, pending, and U.S. Pat. No. 8,645,378 issued Feb. 4, 2014, the disclosures of which are incorporated by reference.

Briefly, a neighborhood for the selected cluster is determined based on a distance metric. Each reference concept in the selected cluster is associated with a score vector and the distance is determined by comparing the score vector of the cluster center with the score vector for each of the reference concepts to determine a neighborhood of reference concepts that are closest to the cluster center. However, other methods for generating a neighborhood are possible. Once determined, one of the classification measures is applied to the neighborhood to determine a suggested classification for the selected cluster, as further discussed below with reference to FIG. 6.

One or more reference concepts nearest to a selected uncoded concept are identified and provided as a neighborhood of reference concepts for the selected uncoded concept. FIG. 5 is a block diagram showing, by way of example, ways to generate a neighborhood 70 of reference concepts for a clustered uncoded concept for use in the method of FIG. 2. Types of neighborhood generation include inclusion 71, injection 72, and nearest neighbor 73. Other ways to generate the neighborhood are possible. Inclusion 71 includes using uncoded concepts and reference concepts to generate clusters, such as described in commonly-assigned U.S. Pat. No. 8,700,627 issued Apr. 15, 2014, the disclosure of which is incorporated by reference. Briefly, a set of reference concepts is grouped with one or more uncoded concepts and are organized into clusters containing both uncoded and reference concepts, as discussed above. The reference concepts in the cluster, or a subset thereof, is then used as the neighborhood for an uncoded concept.

Injection 72 includes inserting reference concepts into clusters of uncoded concepts based on similarity, such as described in commonly-assigned U.S. Patent Application Publication No. 2011/0029530, published Feb. 3, 2011, pending, the disclosure of which is incorporated by reference. Briefly, a set of clusters of uncoded concepts is obtained, as discussed above. Once obtained, a cluster center is determined for each cluster. The cluster center is representative of all the concepts in that particular cluster. One or more cluster centers can be compared with a set of reference concepts and those reference concepts that satisfy a threshold of similarity to that cluster center are selected. The selected reference concepts are then inserted into the cluster associated with that cluster center. The selected reference concepts injected into the cluster can be the same or different as the selected reference concepts injected into another cluster. The reference concepts in the cluster, or a subset thereof, is then used as the neighborhood for an uncoded concept.

Nearest Neighbor 73 includes a comparison of uncoded concepts and reference concepts, such as described in commonly-assigned U.S. Pat. No. 8,645,378, issued Feb. 4, 2014, the disclosure of which is incorporated by reference. Briefly, uncoded concepts are identified and clustered, as discussed above. A reference set of concepts is also identified. An uncoded concept is selected from one of the clusters and compared against the reference set to identify one or more reference concepts that are similar to the selected uncoded concept. The similar reference concepts are identified based on a similarity measure calculated between the selected uncoded concept and each reference document. Once identified, the similar reference concepts, or a subset thereof, is then used as the neighborhood.

Suggesting Classification of Uncoded Concepts

Figure 6:
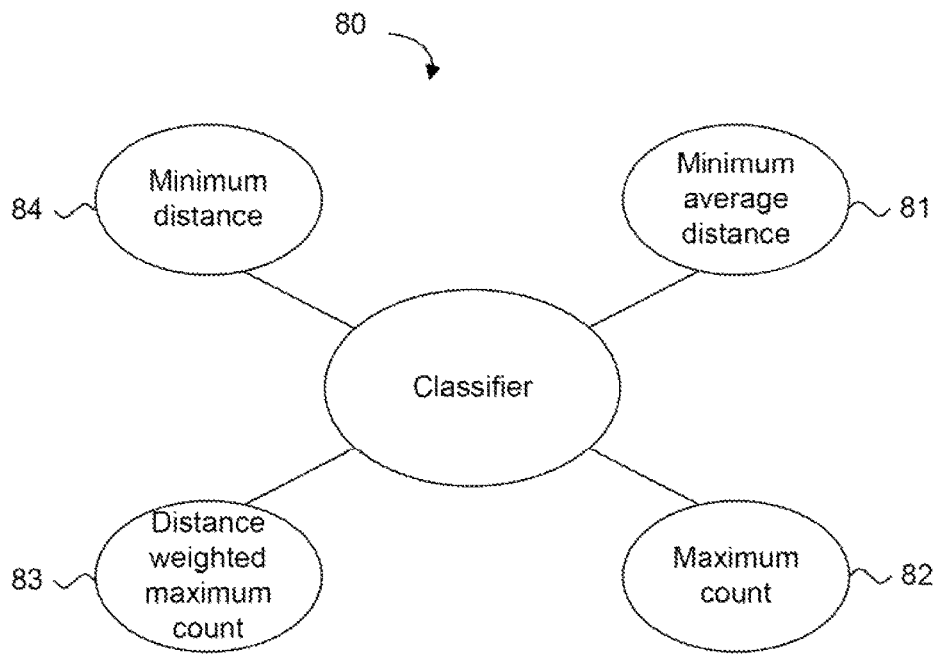
FIG. 6 is a block diagram showing, by way of example, classifier routines for suggesting a classification for an uncoded concept for use in the method of FIG. 2.

An uncoded concept is compared to one or more reference concepts to determine a suggested classification code for the uncoded concept. FIG. 6 is a block diagram showing, by way of example, classifier routines 80 for suggesting a classification for an uncoded concept for use in the method of FIG. 2. Types of classifier routines include minimum distance classification measure 84, minimum average distance classification measure 81, maximum count classification measure 82, and distance weighted maximum count classification measure 83. Other types of classification measures and classifiers are possible.

The minimum distance classification measure 84, also known as closest neighbor, includes determining the closest reference concept neighbor in the neighborhood to the selected uncoded concept. Once determined, the classification of the closest reference concept is used as the classification suggestion for the selected uncoded concept. Score vectors for the selected uncoded concept and for each of a number of reference concepts are compared as the cos σ to determine a distance metric. The distance metrics for the reference concepts are compared to identify the reference concept closest to the selected uncoded concept.

The minimum average distance classification distance measure 81 determines the distances of all reference concepts in the neighborhood, averages the determined distances based on classification, and uses the classification of the closest average distance reference concepts as the classification suggestion. The maximum count classification measure 82, also known as the voting classification measure, includes calculating the number of reference documents in the neighborhood and assigning a count, or "vote", to each reference concept. The classification that has the most "votes" is used as the classification suggestion for the uncoded concept.

The distance weighted maximum count classification measure 83 is a combination of the minimum average distance 81 and maximum count classification measures 82. Each reference concept in the neighborhood is given a count, but the count is differentially weighted based on the distance that reference concept is from the selected uncoded concept. For example, a vote of a reference concept closer to the uncoded concept is weighted heavier than a reference concept further away. The classification determined to have the highest vote count is suggested as the classification of the selected uncoded concept.

A confidence level can be provided for the suggested classification code, as described above with reference to FIG. 3. For example, the neighborhood of a particular uncoded concept can contain a total of five reference concepts, with three classified as "responsive" and two classified as "non-responsive." Determining the classification suggestion using the maximum count classification measure 84 results in a classification suggestion of "responsive" for the uncoded concept, but the confidence level provided can be penalized for each of the non-suggested classification concepts in the neighborhood. The penalty reduces the confidence level of the classification. Other ways of determining the confidence level are possible.

Displaying the Reference Concepts

Figure 7:
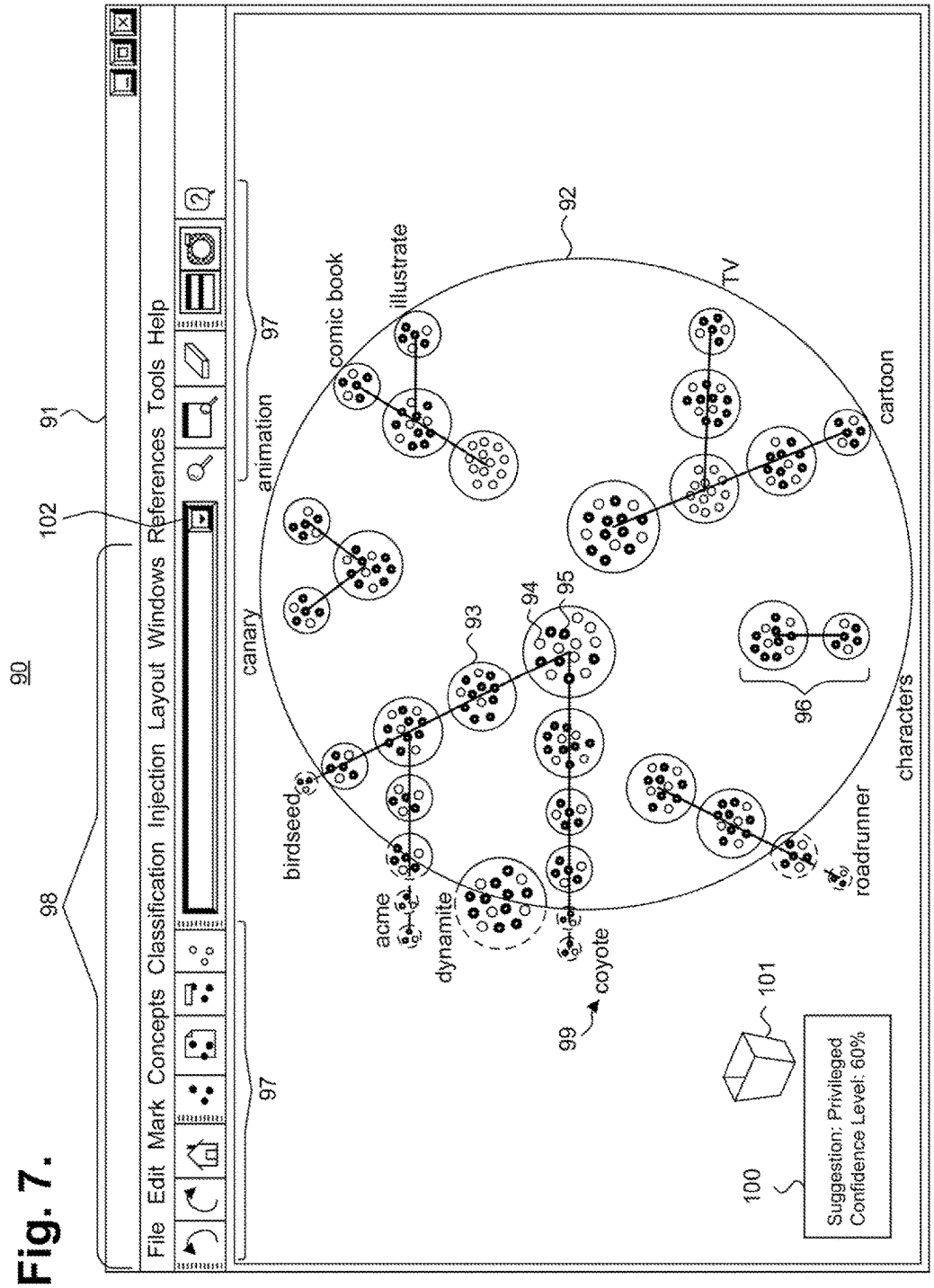
FIG. 7 is a screenshot showing, by way of example, a visual display of reference concepts in relation to uncoded concepts.

The clusters of uncoded concepts and reference concepts can be provided as a display to the reviewer. FIG. 7 is a screenshot 90 showing, by way of example, a visual display 91 of reference concepts in relation to uncoded concepts. Clusters 93 can be located along a spine, which is a vector, based on a similarity of the uncoded concepts in the clusters 93. Each cluster 93 is represented by a circle; however, other shapes, such as squares, rectangles, and triangles are possible, as described in U.S. Pat. No. 6,888,548, the disclosure of which is incorporated by reference. The uncoded concepts 94 are each represented by a smaller circle within the clusters 93, while the reference concepts 95 are each represented by a circle with a diamond-shape within the boundaries of the circle. The reference concepts 95 can be further represented by their assigned classification code. Classification codes can include "privileged," "responsive," and "non-responsive," as well as other codes. Other classification categories are possible. For instance, privileged reference concepts can include a circle with an "X" in the center and non-responsive reference concepts can include a circle with striped lines. Other classification representations for the reference concepts and other classified concepts are possible, such as by color. Each cluster spine 96 is represented as a vector along which the clusters are placed.

The display 91 can be manipulated by a individual reviewer via a compass 92, which enables the reviewer to navigate, explore, and search the clusters 93 and spines 96 appearing within the compass 92, as further described in commonly-assigned U.S. Pat. No. 7,356,777, the disclosure of which is incorporated by reference. The compass 92 visually emphasizes clusters 93 located within the borders of the compass 92, while deemphasizing clusters 93 appearing outside of the compass 92.

Spine labels 99 appear outside of the compass 92 at an end of each cluster spine 96 to connect the outermost cluster of the cluster spine 96 to preferably the closest point along the periphery of the compass 92. In one embodiment, the spine labels 99 are placed without overlap and circumferentially around the compass 92. Each spine label 99 corresponds to one or more concepts for the cluster that most closely describes a cluster spine 96 appearing within the compass 92. Additionally, the cluster concepts for each of the spine labels 99 can appear in a concepts list (not shown) also provided in the display. Toolbar buttons 97 located at the top of the display 91 enable a user to execute specific commands for the composition of the spine groups displayed. A set of pull down menus 98 provide further control over the placement and manipulation of clusters 93 and cluster spines 96 within the display 91. Other types of controls and functions are possible.

The toolbar buttons 97 and pull down menus 98 provide control to the reviewer to set parameters related to classification. For example, the confidence suggestion threshold and discordance threshold can be set at a document, cluster, or cluster spine level. Additionally, the reviewer can display the classification suggestion, as well as further details about the reference concepts used for the suggestion by clicking an uncoded concept, cluster, or spine. For example, a suggestion guide 100 can be placed in the display 91 and can include a "Suggestion" field, a "Confidence Level" field. The "Suggestion" field in the suggestion guide 100 provides the classification suggestion for a selected document, cluster, or spine. The "Confidence Level" field provides a confidence level of the suggested classification. Alternatively, the classification suggestion details can be revealed by hovering over the selection with the mouse.

In one embodiment, a garbage can 101 is provided to remove tokens, such as cluster concepts from consideration in the current set of clusters 93. Removed cluster concepts prevent those concepts from affecting future clustering, as may occur when a reviewer considers a concept irrelevant to the clusters 93.

Figure 8:
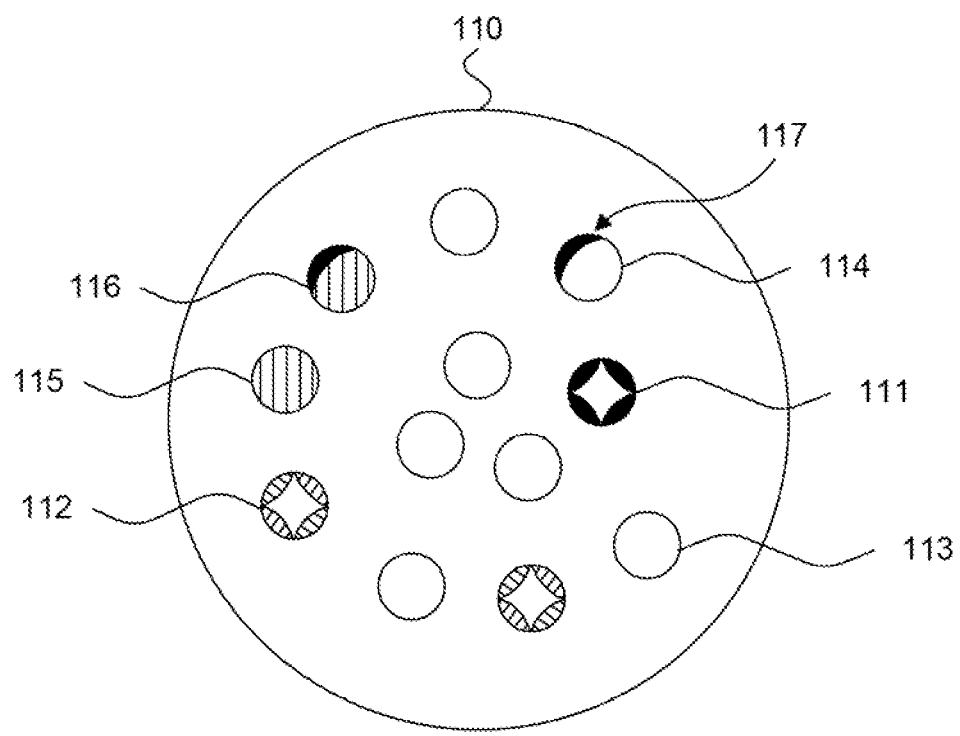
FIG. 8 is a block diagram showing, by way of example, a cluster with a combination of classified reference concepts, uncoded concepts, and concepts given a classification.

The display 91 provides a visual representation of the relationships between thematically related concepts, including uncoded concepts and similar reference concepts. The uncoded concepts and reference concepts located within a cluster or spine can be compared based on characteristics, such as a type of classification of the reference concepts, a number of reference concepts for each classification code, and a number of classification category types in the cluster to identify relationships between the uncoded concepts and reference concepts. The reference concepts in the neighborhood of the uncoded concept can be used to provide a classification code suggestion for the uncoded concept. For example, FIG. 8 is a block diagram showing, by way of example, a cluster 110 with a combination of classified reference concepts, uncoded concepts, and concepts given a classification. The cluster 110 can include one "privileged" reference concept 111, two "non-responsive" concepts 112, seven uncoded concepts 113, one uncoded concept with a "privileged" code suggestion 114, one previously uncoded concept with an accepted "non-responsive" code suggestion 115, and one previously uncoded concept showing a discordance 116 between the classification code suggested and the classification code manually assigned by the reviewer.

The combination of "privileged" 111 and "non-responsive" 112 reference concepts within the cluster can be used by a classifier to provide a classification suggestion to a reviewer for the uncoded reference concepts 113, as further described above with reference to FIG. 6. Uncoded concept 114 has been assigned a suggested classification code of "privileged" by the classier. The classification suggestion can be displayed textually or visually to the reviewer. Other ways of displaying a suggested classification are possible. In one embodiment, uncoded concepts are assigned a color and each classification code is assigned an individual color. Placing the color code of the suggestion on a portion 117 of the uncoded concept 114 denotes the suggested classification code. Similarly, the classification suggestion for an entire cluster can be displayed textually or visually, for example by assigning a color to the cluster circle matching the color of the suggested classification code.

A reviewer can choose to accept or reject the suggested classification, as described further above with reference to FIG. 4. If accepted, the now-classified concept is given the color code of the suggested classification. For example, concept 115 previously assigned a suggestion of "no-responsive," which was subsequently accepted by the reviewer, and given the visual depiction of "non-responsive." In a further embodiment, the suggested classification code is automatically assigned to the uncoded document without the need of prior reviewer approval.

In a further embodiment, discordance between the classification code suggested and the actual classification of the concept is noted by the system. For example, discordant concept 116 is assigned a classification suggestion of "privileged" but coded as "non-responsive." With the discordant option selected, the classification suggested by the classifier is retained and displayed after the uncoded concept is manually classified.

Mapping of Concepts and Documents

A corpus of documents for a review project can be divided into assignments using assignment criteria, such as custodian or source of the documents, content, document type, and date. Other criteria are possible. Each assignment is assigned to an individual reviewer for analysis. The assignments can be separately analyzed or alternatively, analyzed together to determine concepts for the one or more assignments of documents. The content of each document within the corpus can be converted into a set of concepts. As described above, concepts typically include nouns and noun phrases obtained through part-of-speech tagging that have a common semantic meaning. The concepts, which are representative of the documents can be clustered to provide a classification suggestion of the document content.

Clustering of the uncoded concepts provides groupings of related uncoded concepts and is based on a similarity metric using score vectors assigned to each uncoded concept, as described above and such as described in commonly-assigned U.S. Pat. No. 7,610,313, issued Oct. 27, 2009; U.S. Pat. No. 8,700,627, issued Apr. 15, 2014; U.S. Patent Application Publication No. 2011/0029530, published Feb. 3, 2011, pending, and U.S. Pat. No. 8,645,378 issued Feb. 4, 2014, the disclosures of which are incorporated by reference.

Figure 9:
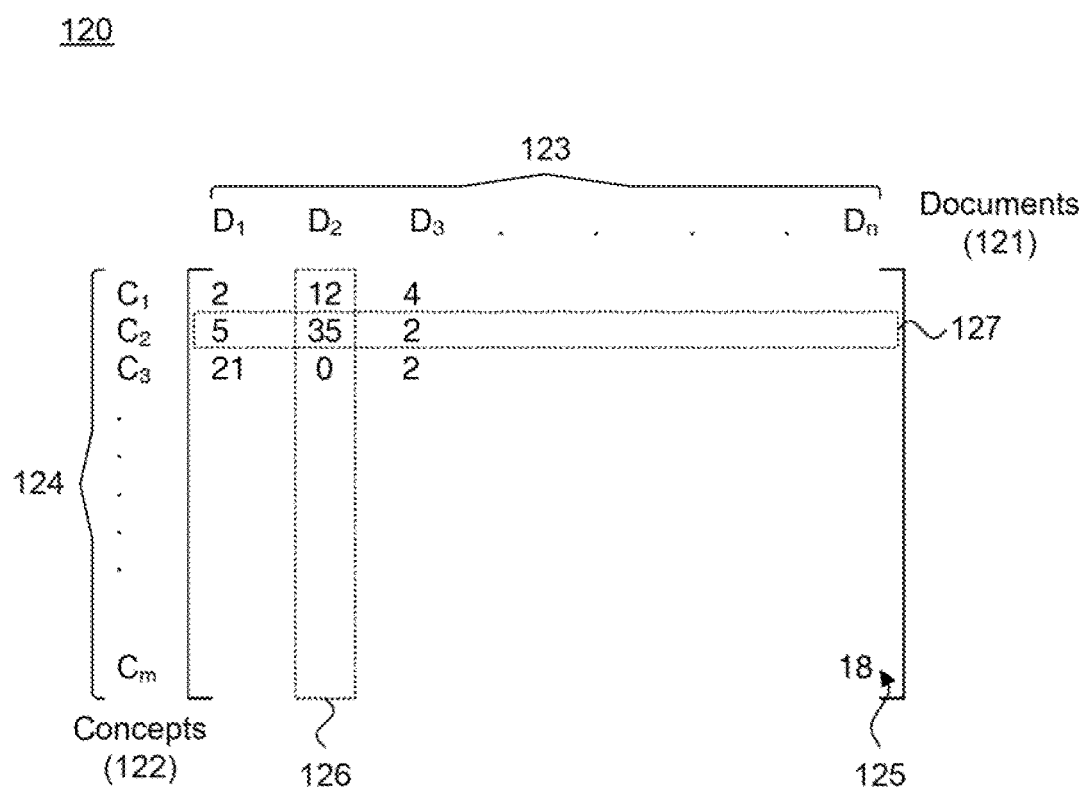
FIG. 9 is a table showing, by way of example, a matrix mapping of uncoded concepts and documents.

The score vectors can be generated using a matrix showing the uncoded concepts in relation to documents that contain the concepts. FIG. 9 is a table showing, by way of example, a matrix mapping 120 of uncoded concepts 124 and documents 123. The uncoded documents 123 are listed along a horizontal dimension 121 of the matrix, while the concepts 124 are listed along a vertical dimension 122. However, the placement of the uncoded documents 123 and concepts 124 can be reversed. Each cell 125 within the matrix 120 includes a cumulative number of occurrences of each concept within a particular uncoded document 123.

Score vectors can be generated for each document by identifying the concepts and associated weights within that document and ordering the concepts along a vector with the associated concept weight. In the matrix 120, the score vector 126 for a document 123 can be identified as all the concepts included in that document and the associated weights, which are based on the number of occurrences of each concept. Score vectors can also be generated for each concept by identifying the documents that contain that concept and determining a weight associated with each document. The documents and associated weights are then ordered along a vector for each concept, as the concept score vector. In the matrix 120, the score vector 127 for a concept can be identified as all the documents that contain that concept and the associated weights. Classification of uncoded concepts then can be associated and applied to the uncoded documents associated with the concept.

In a further embodiment, each document can be represented by more than one concept. Accordingly, to determine a classification code for the document, the classification codes for each of the associated concepts can be analyzed and compared, such as described above with reference to FIG. 6. In one example, a classification code can be determined by counting the number of associated concepts for each classification code and then assigned the classification code with the most associated concepts. In a further example, one or more of the associated concepts can be weighted and the classification code associated with the highest weight of concepts is assigned. Other methods for determining a classification code for uncoded documents based on reference concepts are possible.

Although clustering, classification, and displaying relationships has been described above with reference to concepts, other tokens, such as word-level or character-level n-grams, raw terms, and entities, are possible.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for assigning concept classification suggestions, comprising:
   a database to store one or more clusters of concepts comprising uncoded concepts and one or more reference concepts selected from a set of reference concepts, wherein each reference concept is associated with a classification code; and
   a processor to execute modules, comprising:
      a display module to represent each uncoded concept and reference concept in one such cluster via a shape; and
      an assignment module to perform the following:
         assign to one of the uncoded concepts in the cluster the classification code of the closest located reference concept to the uncoded concept as a suggested classification code;
         fill a portion of the shape representing the uncoded concept with a color representing the suggested classification code; and
         receive from a user a confirmation of the suggested classification code for the uncoded concept; and
         completely fill the shape representing the uncoded concept with the same color upon confirmation of the suggested classification code from the user by filling a remaining portion of the shape with the same color;
         assign a further classification code to a further uncoded concept in the cluster as a further suggested classification code;
         fill at least a portion of the shape representing the further uncoded concept with a color representing the further suggested classification code;
         receive from the user a different classification code for the further uncoded concept; and
         display the further uncoded concept with the color of the further suggested classification code and a color of the different classification code received from the user.

2. The system according to claim 1, further comprising:
   a classification display module to display at least one of the classification codes for each reference concept with respect to the shape for that reference concept.

3. The system according to claim 1, further comprising:
   a similarity module to determine a confidence level for the suggested classification code and to accept the suggested classification code for the uncoded concept when the confidence level satisfies a predetermined threshold for similarity.

4. The system according to claim 3, further comprising:
   a similarity determination module to determine the similarity via at least one of a measure of similarity and a measure of dissimilarity between the uncoded concept and the closest located reference concept.

5. The system according to claim 1, further comprising:
   a database to store the uncoded concept and accepted classification code with the set of reference concepts.

6. The system according to claim 1, wherein each of the reference concepts and uncoded concepts represents at least one document.

7. The system according to claim 6, further comprising:
   a document assignment module to assign the suggested classification code of the uncoded concept to the at least one document represented by the uncoded concept as a suggested classification code.

8. The system according to claim 1, wherein the closest located reference document is most similar to the uncoded document.

9. A computer-implemented method for assigning concept classification suggestions, comprising the steps of:
   accessing one or more clusters of concepts comprising uncoded concepts and one or more reference concepts selected from a set of reference concepts, each reference concept associated with a classification code;
   representing each uncoded concept and reference concept in one such cluster via a shape;
   assigning to one of the uncoded concepts the classification code of the closest located reference concept to the uncoded concept as a suggested classification code;
   filling a portion of the shape representing the uncoded concept with a color representing the suggested classification code;
   receiving from a user a confirmation of the suggested classification code for the uncoded concept;
   completely filling the shape representing the uncoded concept with the same color upon confirmation of the suggested classification code from the user by filling a remaining portion of the shape with the same color;
   assigning a further classification code to a further uncoded concept in the cluster as a further suggested classification code;
   filling at least a portion of the shape representing the further uncoded concept with a color representing the further suggested classification code;
   receiving from the user a different classification code for the further uncoded concept; and
   displaying the further uncoded concept with the color of the further suggested classification code and a color of the different classification code received from the user,
   wherein the steps are performed by a suitably programmed computer.

10. The method according to claim 9, further comprising:
    displaying the classification code for each reference concept with respect to the shape for that reference concept.

11. The method according to claim 9, further comprising:
   determining a confidence level for the suggested classification code;
   accepting the suggested classification code for the uncoded concept when the confidence level satisfies a predetermined threshold for similarity.

12. The method according to claim 11, further comprising:
   determining the similarity via at least one of a measure of similarity and a measure of dissimilarity between the uncoded concept and the closest located reference concept.

13. The method according to claim 9, further comprising:
   storing the uncoded concept and accepted classification code with the set of reference concepts.

14. The method according to claim 9, wherein each of the reference concepts and uncoded concepts represents at least one document.

15. The method according to claim 14, further comprising:
   assigning the suggested classification code of the uncoded concept to the at least one document represented by the uncoded concept as a suggested classification code.

16. The method according to claim 9, wherein the closest located reference document is most similar to the uncoded document.

* * * * *